(12) United States Patent
Ishizaka et al.

(10) Patent No.: US 10,427,560 B2
(45) Date of Patent: Oct. 1, 2019

(54) VEHICLE SEAT

(71) Applicant: TOYOTA BOSHOKU KABUSHIKI KAISHA, Aichi-ken (JP)

(72) Inventors: Masanori Ishizaka, Aichi-ken (JP); Yuki Miyawaki, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/997,876

(22) Filed: Jun. 5, 2018

(65) Prior Publication Data
US 2018/0361890 A1     Dec. 20, 2018

(30) Foreign Application Priority Data

Jun. 14, 2017   (JP) .................................. 2017-116885

(51) Int. Cl.
*B60N 2/26*   (2006.01)
*B60N 2/28*   (2006.01)

(52) U.S. Cl.
CPC .................................. *B60N 2/2893* (2013.01)

(58) Field of Classification Search
CPC .................................................. B60N 2/2893
USPC ............................................................ 297/253
See application file for complete search history.

(56) References Cited

U.S. PATENT DOCUMENTS

| | | | | |
|---|---|---|---|---|
| 6,582,016 B1 * | 6/2003 | Kirchoff | ................ | B60N 2/286 297/253 |
| 7,281,763 B1 * | 10/2007 | Hayashi | ............... | B60N 2/2893 297/253 |
| 7,328,947 B2 * | 2/2008 | Laporte | ............... | B60N 2/2809 297/254 |
| 7,789,462 B2 * | 9/2010 | Glover | .................... | B60N 2/58 297/253 |
| 9,604,555 B2 * | 3/2017 | Fujikake | ................ | B60N 2/289 |
| 9,738,183 B2 * | 8/2017 | Szlag | ....................... | B60N 2/58 |
| 10,052,980 B2 * | 8/2018 | Konrad | ................ | B60N 2/2893 |
| 10,189,382 B2 * | 1/2019 | Sammons | ........... | B60N 2/2893 |
| 10,239,424 B2 * | 3/2019 | Terada | ................... | B60N 2/289 |

(Continued)

FOREIGN PATENT DOCUMENTS

| | | | | |
|---|---|---|---|---|
| DE | 10062963 A1 * | 6/2002 | ............... | B60N 2/28 |
| DE | 102015221450 A1 * | 5/2017 | ............ | B60N 2/289 |

(Continued)

*Primary Examiner* — Rodney B White

(74) *Attorney, Agent, or Firm* — Greenblum & Bernstein, P.L.C.

(57) ABSTRACT

A vehicle seat including: a cover member including: a front plate portion covering an opening edge portion of a front opening of a through hole; and a tubular side plate portion extending rearward from an inner end portion of the front opening of the front plate portion and covering at least a part of an outer peripheral wall portion of the through hole; and a lid member, wherein the cover member includes an R-chamfered portion configured to guide an attaching member into the through hole, the R-chamfered portion being formed between the front plate portion and the side plate portion, and wherein an outer peripheral edge portion of the lid member abuts on the side plate portion of the cover member at an R-end point of the R-chamfered portion or at a position rear than the R-end point, so that the lid member is attached to the cover member.

4 Claims, 6 Drawing Sheets

(56) References Cited

U.S. PATENT DOCUMENTS

| | | | | |
|---|---|---|---|---|
| 2002/0104190 A1* | 8/2002 | Moore | ........... | B60N 2/2809 |
| | | | | 16/231 |
| 2004/0084940 A1* | 5/2004 | Morita | ........... | B60N 2/2821 |
| | | | | 297/253 |
| 2015/0084388 A1* | 3/2015 | Arai | ........... | B60N 2/6009 |
| | | | | 297/250.1 |
| 2016/0250948 A1* | 9/2016 | Sekino | ........... | B60N 2/6009 |
| | | | | 297/452.48 |
| 2018/0056820 A1* | 3/2018 | Sammons | ........... | B60N 2/2893 |
| 2018/0065512 A1* | 3/2018 | Wieczorek | ........... | B60N 2/2893 |

FOREIGN PATENT DOCUMENTS

| | | | | |
|---|---|---|---|---|
| FR | 2868023 A1 * | 9/2005 | ........... | B60N 2/2809 |
| FR | 2975643 A1 * | 11/2012 | ........... | B60N 2/289 |
| JP | 2001-354058 | 12/2001 | | |
| JP | 2015067255 A * | 4/2015 | ........... | B60N 2/6009 |

* cited by examiner

VEHICLE SEAT

CROSS-REFERENCE TO RELATED APPLICATIONS

This application claims priority from Japanese Patent Application No. 2017-116885 filed on Jun. 14, 2017, the entire contents of which are incorporated herein by reference.

TECHNICAL FIELD

The disclosure relates to a vehicle seat.

BACKGROUND

There has been known a vehicle seat to which an ISOFIX type child seat in accordance with ISOFIX, which is an international standard for installing a child seat, is capable of being attached. In such a vehicle seat, ISOFIX anchors, which are locking members to which a pair of left and right attaching members provided at a rear portion of the child seat are locked, are disposed in through holes provided at a rear end portion or the like of a seat cushion of the vehicle seat. Further, a cover member is provided so as to protect an outer peripheral edge portion of a front opening of the through hole and an outer peripheral wall portion of the through hole and to improve external appearance. In the vehicle seat described in JP-A-2001-354058, a cover member made of resin is attached to a seat pad on which a seat cover is stretched by engaging a part of the cover member with the ISOFIX anchor. Further, a lid member for opening and closing a front opening of the cover member is attached.

In the technology described in JP-A-2001-354058, the lid member is attached such that a flange portion of the cover member is covered from a front side. Meanwhile, in a case where there is a demand in design or a demand to minimize a portion protruding forward from the cover member, the lid member is disposed at an inner side of the flange portion of the cover member. In such a case, when it is intended to smoothly insert the pair of left and right attaching members provided at the rear portion of the child seat into the through holes without a risk of being caught by the flange portion of the cover member, an R-chamfered portion is preferably provided at an inner corner portion of the flange portion of the cover member. However, when the R-chamfered portion is provided, there is a problem that a gap between the inner side of the flange portion of the cover member and an outer peripheral edge portion of the lid member looks larger and the appearance design may be deteriorated.

SUMMARY

In view of the above problems, an object of the disclosure is to provide a vehicle seat configured such that an ISOFIX anchor fixed to a vehicle body is arranged in a through hole of the vehicle seat, and a lid member can be attached, with a good appearance, to a cover member which is attached to a front opening of the through hole and in which the attaching member can be attached to the ISOFIX anchor with a good attaching workability.

According to an aspect of the disclosure, there is provided a vehicle seat in which a through hole extending substantially in a front-rear direction is provided at a rear end portion of a seat cushion or a lower end portion of a seat back, a locking member attached to a vehicle body being provided in the through hole, and the locking member being configured to lock an attaching member which is provided to a child seat and inserted inside the through hole, the vehicle seat including: a cover member including: a front plate portion covering an opening edge portion of a front opening of the through hole; and a tubular side plate portion extending rearward from an inner end portion of the front opening of the front plate portion and covering at least a part of an outer peripheral wall portion of the through hole; and a substantially flat plate-shaped lid member having an outer peripheral edge portion along an inner side face of the side plate portion and configured to be attached to the cover member in a state where the outer peripheral edge portion thereof abuts on the inner side face of the side plate portion, wherein the cover member includes an R-chamfered portion configured to guide the attaching member into the through hole, the R-chamfered portion being formed between the front plate portion and the side plate portion, and wherein the outer peripheral edge portion of the lid member abuts on the side plate portion of the cover member at an R-end point of the R-chamfered portion or at a position rear than the R-end point, so that the lid member is attached to the cover member.

Accordingly, since the R-chamfered portion configured to guide the attaching member into the through hole is formed between the front plate portion and the side plate portion, the attaching member can be guided into the through hole even if a tip end portion thereof abuts on the cover member when inserting the attaching member into the through hole. In addition, since the outer peripheral edge portion of the substantially flat plate-shaped lid member abut on and is attached to the side plate portion of the cover member at the position rear than the R-end point of the R-chamfered portion of the side plate portion, a gap between the side plate portion of the cover member and the outer peripheral edge portion of the lid member is made small and the lid member can be attached with good appearance.

DETAILED DESCRIPTION

FIGS. 1 to 5 show an embodiment of the disclosure. The present embodiment is an example in which the disclosure is applied to an automobile seat 1. In each figure, directions of an automobile and the automobile seat 1 when the automobile seat 1 is attached to a floor F of the automobile are shown by the arrows. The description on direction is made with reference to the directions in the following description. Here, the automobile seat 1 and the floor F correspond to "vehicle seat" and "vehicle body" in the claims, respectively.

Figure 1:
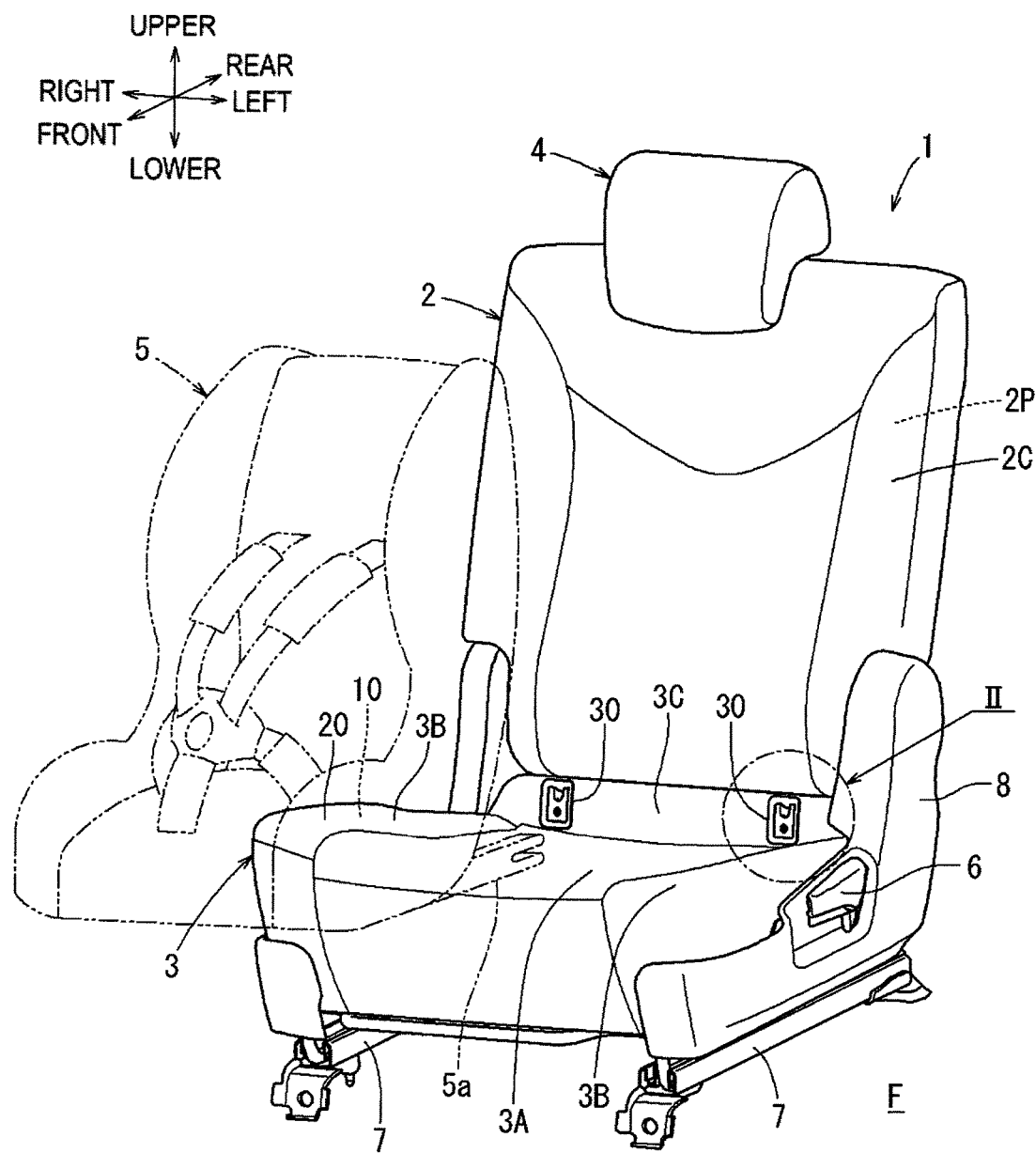
FIG. 1 is a perspective view of an automobile seat according to an embodiment of the disclosure.

FIG. 1 shows a schematic configuration of the automobile seat 1 to which a child seat 5 conforming to ISOFIX can be attached. The automobile seat 1 is configured as a front side seat of an automobile, and includes a seat back 2 as a backrest, a seat cushion 3 as a seating part, and a headrest 4 as a headrest part of a seated occupant.

Figure 3:
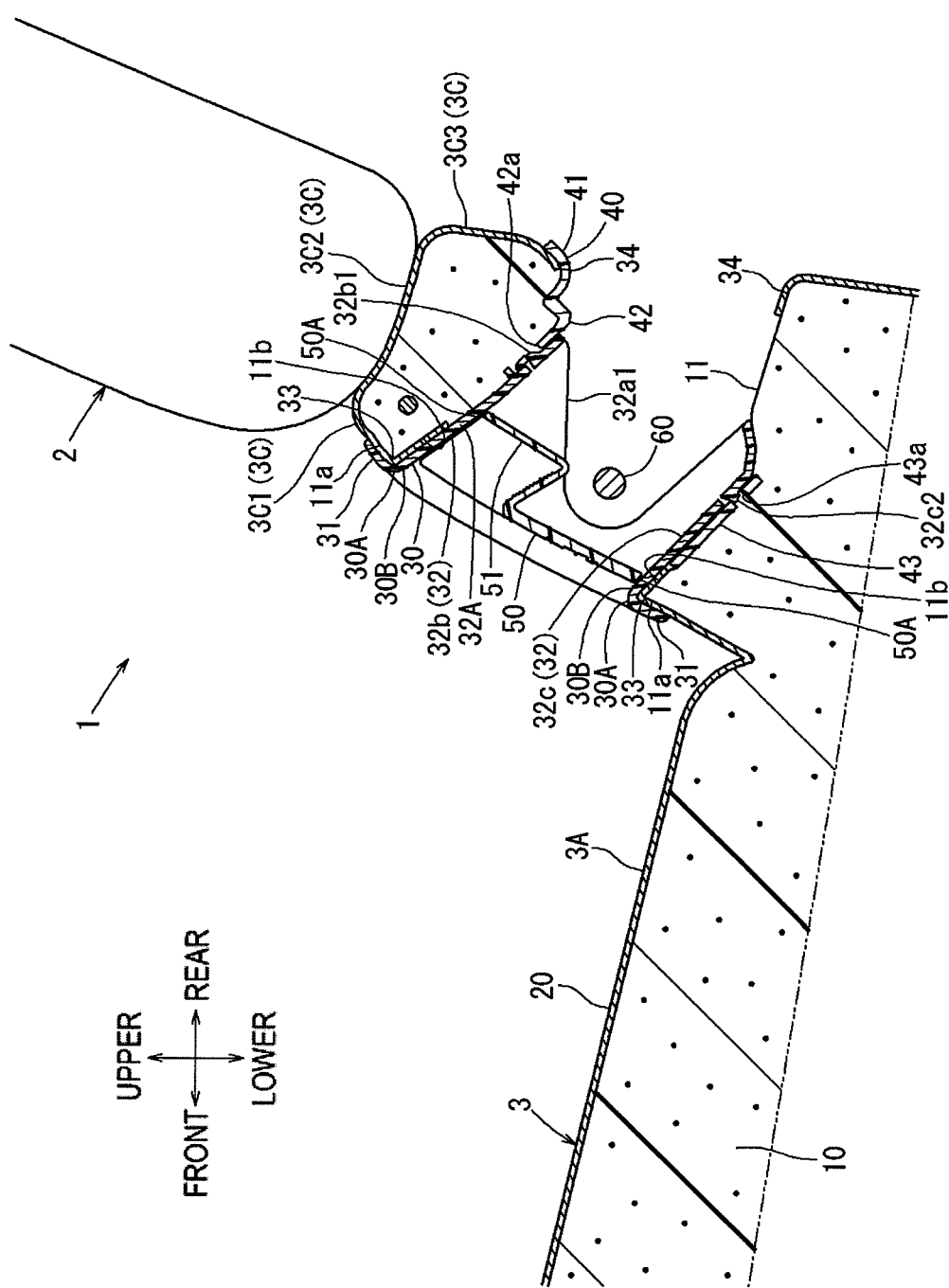
FIG. 3 is a cross sectional view taken along a line III-III in FIG. 2.
Figure 4:
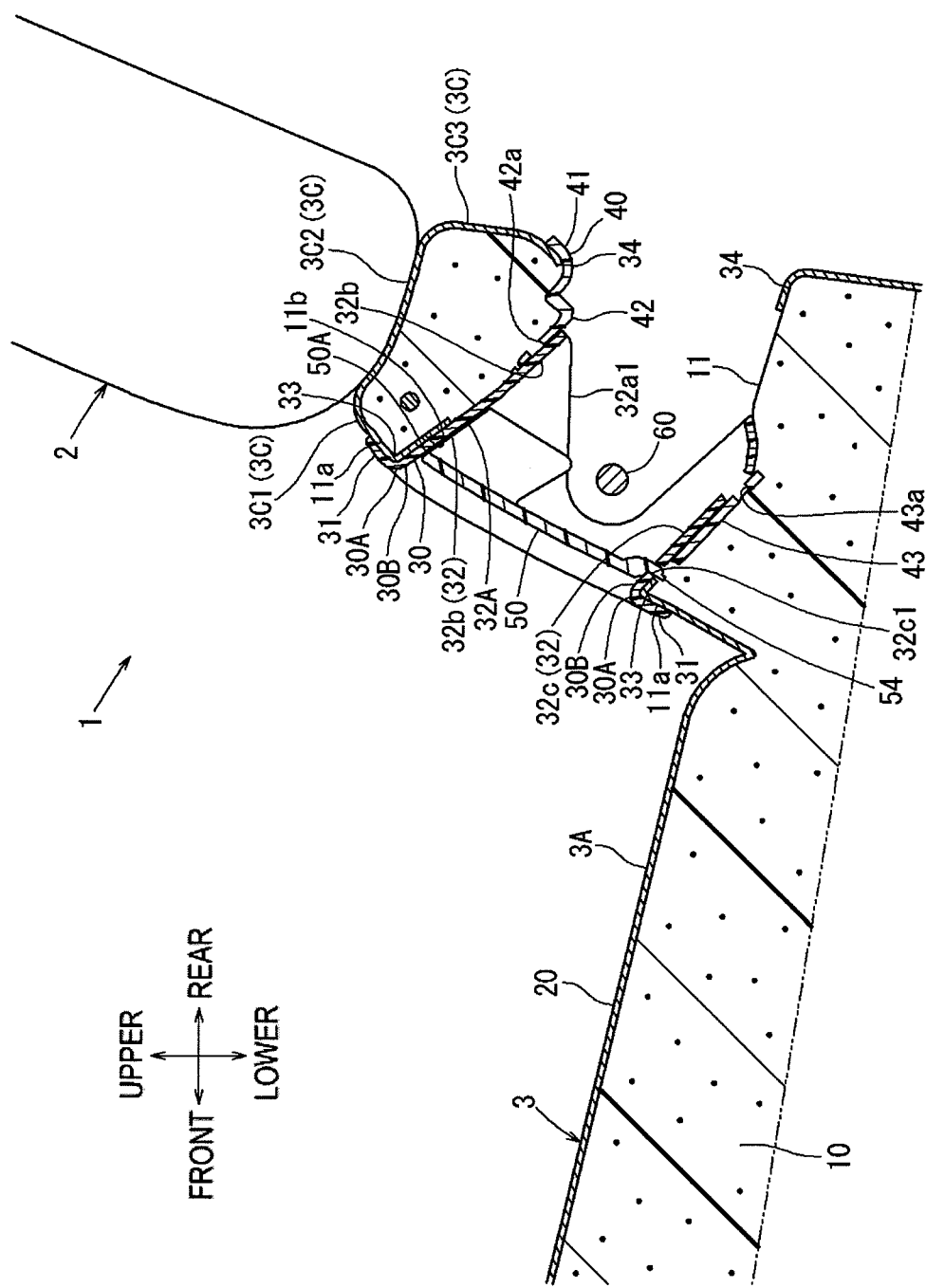
FIG. 4 is a cross sectional view taken along a line IV-IV in FIG. 2.
Figure 5:
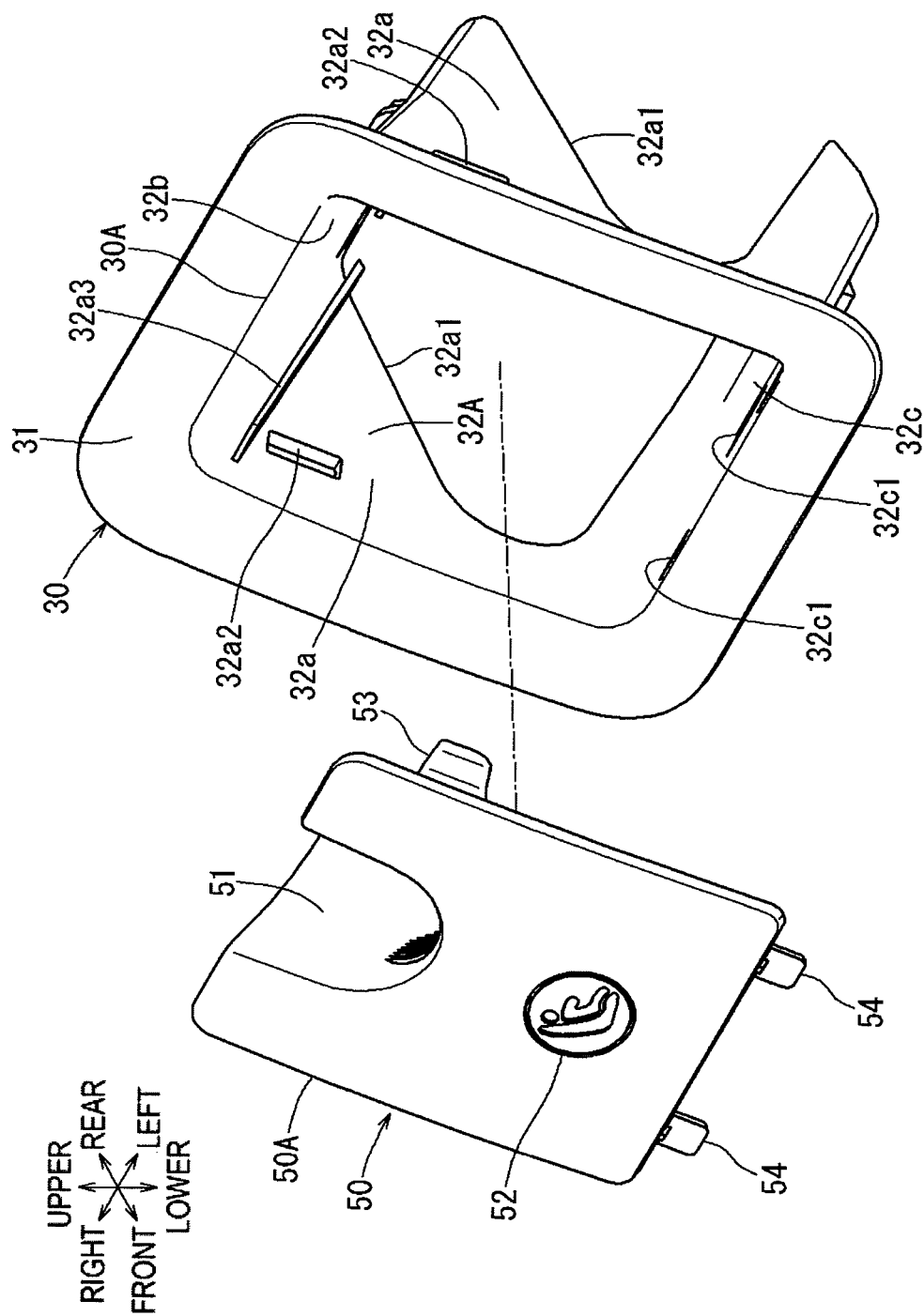
FIG. 5 is an exploded perspective view of a cover member and a lid member according to the above-described embodiment.

Lower end portions on left and right sides of the seat back 2 are respectively connected to rear end portions on left and right sides of the seat cushion 3 via a recliner (not shown) functioning as a rotation shaft device capable of stopping rotation. Accordingly, the seat back 2 is always held in a state where a backrest angle is fixed by a lock structure in which each recliner is held in a rotation stopping state. Further, by releasing the rotation stopping state of each recliner by the operation of a release lever 6, the seat back 2 is switched to a state in which the backrest angle can be changed in a front-rear direction around a center axis of each recliner. The backrest angle of the seat cushion 3 with respect to the seat back 2 as shown in FIG. 1, FIG. 3 and FIG. 4 is set to a standard state in which the seat back 2 stands on the rear end portion of the seat cushion 3.

As shown in FIG. 1, the seat back 2 includes a back frame (not shown) forming a framework, a back pad 2P made of urethane foam which is a cushion material, and a back cover 2C made of a skin material. The exterior shape of the seat back 2 is formed according to the back pad 2P provided in the back cover 2C.

As shown in FIG. 1, the seat cushion 3 includes a cushion frame (not shown) forming a framework, a cushion pad 10 made of foamed urethane which is a cushion material, and a cushion cover 20 made of a skin material. The exterior shape of the seat cushion 3 is formed according to the cushion pad 10 provided in the cushion cover 20. The cushion frame is attached to the floor F via a pair of right and left slide rails 7 extending in the front-rear direction so that the seat cushion 3 is movable and adjustable in the front-rear direction. A lower portion of the seat back 2 and a side portion of the seat cushion 3 are covered with a resin shield 8 so as to improve the exterior appearance. An opening is provided on a rear side of the left shield 8 and the release lever 6 extends frontward from the opening.

As shown in FIGS. 1 to 4, the seat cushion 3 includes a top plate main portion 3A forming a center portion in a width direction thereof, top plate side portions 3B forming both side portions in the width direction thereof, and a rear wall portion 3C projecting upward at the rear end portion thereof. The top plate main part 3A is a portion whose upper surface has a relatively flat surface shape and supports buttocks and thighs of a seated occupant from a lower side. The top plate side portion 3B is a portion that has a surface shape in which each upper surface is obliquely bulged in a mountain shape toward an upper outer side and supports the buttocks and thighs of the seated occupant obliquely from both outer sides. The rear wall portion 3C includes a front surface portion 3C1 formed in a surface shape bulging in a mountain shape toward an upper rear side and adjacent to rear end portions of the top plate main portion 3A and the top plate side portions 3B, an upper surface portion 3C2 abutting on a lower portion of the seat back 2 and a rear surface portion 3C3 facing the front surface portion 3C1. The front surface portion 3C1 is a portion that supports the buttocks of the seated occupant obliquely from a rear side. A pair of through holes 11 penetrating substantially in the front-rear direction are disposed between the front surface portion 3C1 and the rear surface portion 3C3 at positions which are bilateral symmetrical with respect to a left-right center line of the seat cushion 3. As described later, a pair of left and right cover members 30 is attached to the front surface portion 3C1 such that opening end portions on the front side of the through holes 11 are covered, and one wire 60 of each ISOFIX anchor 60 is respectively disposed therein. The upper surface portion 3C2 abuts on a lower portion of the seat back 2 in an interference state and is deformed by being pressed downward. A pair of right and left connectors 5a is provided on a rear lower side of the child seat 5. Each connector 5a is inserted into the cover members 30 and operated to be pushed from a front side to the wire 60 so as to be locked to the wire 60. Here, the wire 60 and the connector 5a correspond to the "locking member" and "attaching member" in the claims respectively.

Figure 2:
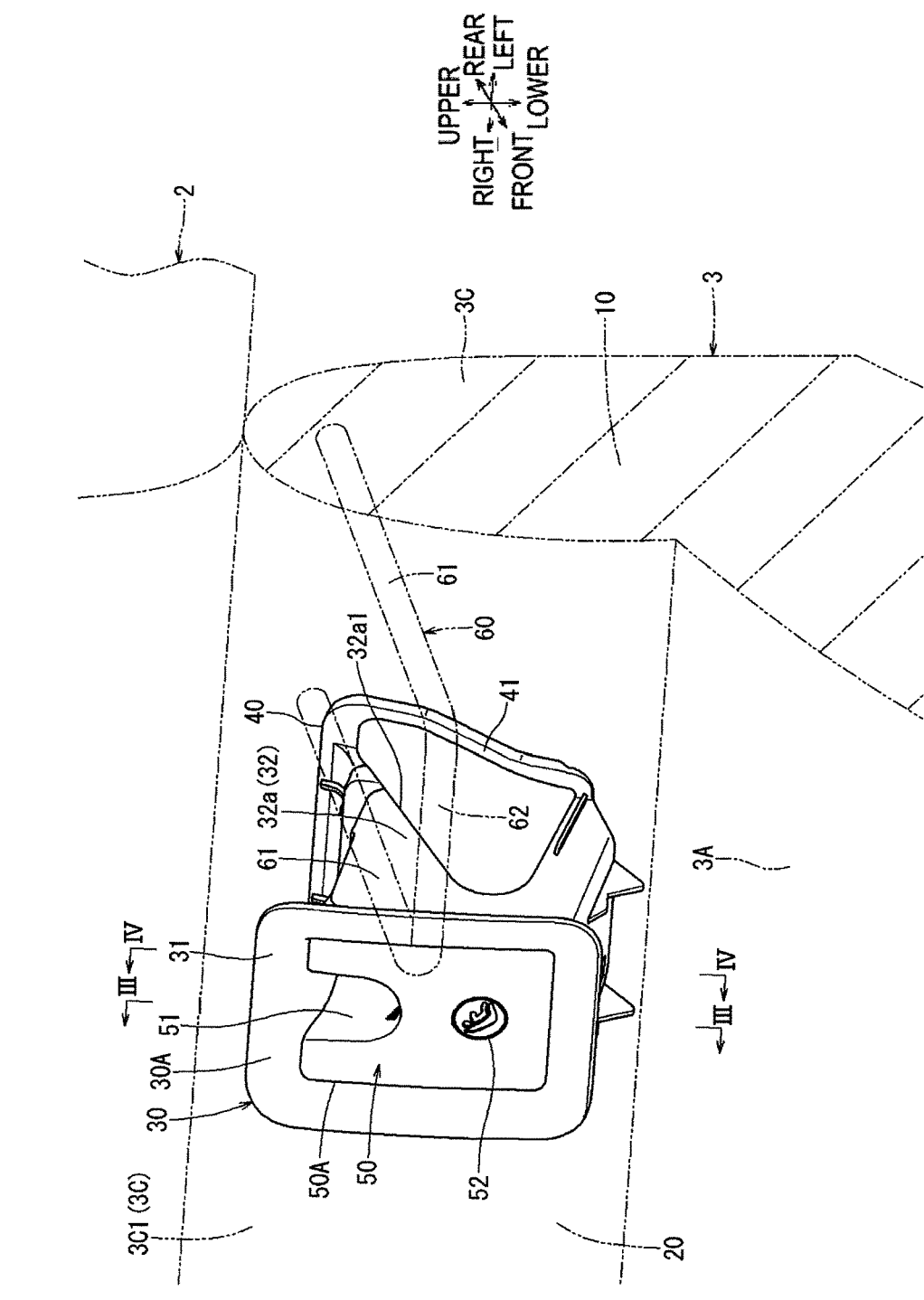
FIG. 2 is an enlarged schematic diagram of part II in FIG. 1.

As shown in FIGS. 2 to 4, the pair of through holes 11 penetrating substantially in the front-rear direction are provided in the cushion pad 10 of the rear wall portion 3C at positions which are bilaterally symmetrical with respect to the left-right center line of the seat cushion 3. Since the left and right through holes 11 are the same in shape and structure, the left through hole 11 will be described as an example. The through hole 11 is formed such that an upper-lower length of a front opening 33 on the front surface portion 3C1 of the rear wall portion 3C is slightly longer than an upper-lower length of a rear opening 34 of the rear surface portion 3C3 of the rear wall portion 3C and a cross section of the through hole is substantially rectangular. That is, the through hole 11 is formed as a hole having a shape corresponding to a quadrangular prism which tilts downward substantially toward the rear direction. The cushion pad 10 is covered with the cushion cover 20. Further, an end portion of the cushion cover 20 is folded and adhered from an opening edge portion 11a of the cushion pad 10, which is equivalent to a peripheral edge portion of the front opening 33 of the through hole 11, to the outer peripheral wall portion 11b of the through hole 11 provided in the cushion pad 10 so as to form the through hole 11. Similarly, an end portion of the cushion cover 20 is folded and adhered from a peripheral edge portion of the rear opening 34 of the through hole 11 to the outer peripheral wall portion 11b of the through hole 11.

As shown in FIGS. 2 to 4, the resin cover members 30 covering the opening edge portion 11a of the front opening 33b and the outer peripheral wall portion 11b via the cushion cover 20 is attached to the pair of right and left through holes 11 of the cushion pad 10. A rear end portion of the cover member 30 inserted into the through hole 11 is locked to a front end portion of the attaching member 40 whose front end portion is inserted into the through hole 11 from the rear opening 34, so that the cover member 30 is attached to the cushion pad 10. A lid member 50 for covering the inside of the through hole 11 so as to be invisible from the front is attached to an inner tubular portion of the cover member 30. Since the left and right cover members 30, attaching members 40 and lid members 50 are the same in shape and structure, the left cover member 30, attaching member 40 and lid member 50 will be described as an example.

As shown in FIGS. 2 to 5, the cover member 30 includes a front plate portion 31 in a form of a rectangular thin frame in which a longitudinal direction thereof is the upper-lower direction, and a side plate portion 32 having a substantially rectangular cross section formed so as to extend rearward along the outer peripheral wall portion 11b of the through hole 11 approximately from an inner end portion of the front plate portion 31. An inner tubular side face of the side plate portion 32 is formed as an inner side face 32A. The front plate portion 31 is formed into a flange shape of the side plate portion 32 so as to cover an outer peripheral edge portion of the front opening 33 of the through hole 11. The side plate portion 32 includes a pair of left and right side plate portions 32a, an upper side plate portion 32b connecting upper end portions of the left and right side plate portions 32a, and a lower side plate portion 32c connecting lower end portions of the left and right side plate portions 32a. An R-chamfered portion 30A having a relatively large radius of 5 mm is formed between the front plate portion 31 and the left and right side plate portions 32a, the front plate portion 31 and the upper side plate portion 32b, and the front plate portion 31 and the lower side plate portion 32c. The R-chamfered portion 30A guides a connector 5a of the child seat 5 to be smoothly inserted into the through hole 11 when attaching the child seat 5 to the automobile seat 1. Therefore, a chamfer radius of the R-chamfered portion 30A is preferably as large as possible for smooth guiding of the connector 5a, but 3 to 7 mm would be appropriate in view of the balance with the appearance. An R-end point of the side plate portion 32, which is a rear end portion of the R-chamfered portion 30A, is an R-end point 30B, and the left and right side plate portions 32a, the upper side plate portion 32b, and the lower side plate portion 32c extend rearward and downward in a substantially linear form from the R-end point 30B.

As shown in FIGS. 2 to 5, the left and right side plate portions 32a are provided with a V-shaped notch 32a1 having an opening opened rearward in a side view, and when the cover member 30 is attached to the cushion pad 10, a horizontal rod portion 62 of the wire 60 of the ISOFIX anchor to be described later is positioned on an opposite side of the V-shaped opening which is a front end portion thereof. A rectangular first locking hole 32a2 extending in the upper-lower direction to which a first locking claw 53 of the lid member 50 to be described later is locked is provided in parallel with the front plate portion 31 on an upper front end portion side of the left and right side plate portions 32a. A pair of standing walls 32a3 extending in parallel with the upper side plate portion 32b in a direction coming close to each other is provided on an upper side of the first locking holes 32a2 of the left and right side plate portions 32a. The standing wall 32a3 has a function of positioning the lid member 50 in the front-rear direction with respect to the cover member 30 when the lid member 50 is attached to the cover member 30. A pair of left and right rectangular second locking holes 32c1 extending in the left-right direction to which a second locking claw 54 of the lid member 50 described later is locked are provided in parallel with the front plate portion 31 and slightly rear than the R-end point 30B of the lower side plate portion 32c. Further, a third locking claw 32b1 for locking to the attachment member 40 is provided at a rear end portion side of the upper side plate portion 32b, and a fourth locking claw 32c2 for locking to the attachment member 40 is provided at a rear end portion side of the lower side plate portion 32c.

As shown in FIGS. 2 to 4, the attaching member 40 has a frame-shaped portion 41 formed to abut on the outer peripheral edge portion of the rear opening 34 of the through hole 11 from the rear, an upper wall portion 42 extending upward and forward from a lower end portion of an upper portion of the frame-shaped portion 41, and a lower wall portion 43 extending upward and forward from a lower portion of the frame-shaped portion 41. The frame-shaped portion 41 is formed in a substantially inverted U shape opening downward. A third locking hole 42a to which the third locking claw 32b1 of the cover member 30 is locked is provided at a front end portion side of the upper wall portion 42, and a fourth locking hole 43a to which the fourth locking claw 32c2 of the cover member 30 is locked is provided at a rear end portion side of the lower plate portion 43. The third locking claw 32b1 is locked to the third locking hole 42a and the fourth locking claw 32c2 is locked to the fourth locking hole 43a when the side plate portion 32 of the cover member 30 is inserted from the front opening 33 of the through hole 11, and the upper wall portion 42 and the lower wall portion 43 of the attaching member 40 is inserted from the rear opening 34. Therefore, the cover member 30 and the attaching member 40 are disposed in the through hole 11, and the cover member 30 and the attaching member 40 are attached to the cushion pad 10. At this time, the front plate portion 31 of the cover member 30 abuts on the outer peripheral edge portion of the front opening 33 via the cushion cover 20 on a rear side thereof, and the frame-shaped portion 41 of the attaching member 40 abuts on the outer peripheral edge portion of the rear opening 34 via the cushion cover 20 on a front side thereof.

As shown in FIGS. 2 to 5, the lid member 50 is a rectangular plate member in which a longitudinal direction thereof is the upper-lower direction. An outer shape of an outer peripheral edge portion 50A in the front view of the lid member 50 is formed so as to be detachably fitted to the inner side face 32A of the side plate portion 32 of the cover member 30. Light chamfering is applied to the outer peripheral edge portion 50A of the lid member 50. A concave portion 51 opening upward and having a substantially U-shape as viewed from the front is provided on an upper portion of the lid member 50. The concave portion 51 is a portion to which a finger is hooked when the lid member 50 attached to the cover member 30 is pulled forward and removed, and a slip preventing process is applied to a lower portion of the concave portion 51. A mark 52 indicating that the ISOFIX anchor is built in is attached below the concave portion 51 of the lid member 50. The pair of first locking claws 53 extending perpendicularly to a main body of the lid member 50 toward a rear lower side are provided on both left and right sides of the upper portion of the lid member 50. The pair of second locking claws 54 extending in parallel to the main body of the lid member 50 toward a front lower side are provided on both left and right sides of the lower portion of the lid member 50.

As shown in FIGS. 2 to 5, the second locking claw 54 of the lid member 50 is locked to the second locking hole 32c1 of the cover member 30 and an upper end side of the lid member 50 is rotated to the rear side, so that a rear face side of the main body of the lid member 50 abuts on a front end portion of the standing walls 32a3. Further, the locking claw 53 of the lid member 50 is locked to the first locking hole 32a3 of the cover member 30 so as to be held on the inner side face 32A of the side plate portion 32 of the cover member 30. Here, the outer peripheral edge portion 50A of the lid member 50 abuts on the inner side face 32A of the side plate portion 32 of the cover member 30 at a flat plate portion rear than the R-end point 30B. Although light chamfering is applied to the outer peripheral edge portion 50A of the lid member 50, since it is a C chamfer whose dimension is much smaller than the radius of the R-chamfered portion 30A, a gap between the cover member 30 and the lid member 50 appears small and the appearance looks good. More specifically, if the lid member 50 is arranged flush with the front plate portion 31 of the cover member 30, the radius of the R-chamfered portion 30A is large, and therefore the gap between the inner side face 32A of the cover member 30 and the outer peripheral edge portion 50A of the lid member 50 becomes large. Meanwhile, in the present embodiment, although the outer peripheral edge portion 50A of the lid member 50 abuts on the flat plate portion of the side plate portion 32 of the cover member 30, since the outer peripheral edge portion 50A is merely light chamfered, the gap between the cover member 30 and the lid member 50 appears small.

As shown in FIG. 2, the wire 60 of the ISOFIX anchor is fixed to the floor F via a base member (not shown). A pair of left and right wires 60 of the ISOFIX anchor is provided in correspondence with the through holes 11, and since the left and right wires are the same in shape and structure, the left wire 60 will be described as an example. The wire 60 includes a pair of vertical rod portions 61 extending in the front-rear direction in parallel to each other and a horizontal rod portion 62 connecting front end portions of the vertical rod portions 61 and extending in the left-right direction. The connector 5a of the child seat 5 is attached to the horizontal rod portion 62.

A process for assembling the automobile seat 1 and a process for attaching the automobile seat 1 to the floor F will be described with reference to FIGS. 3 and 4. The cushion pad 10 is placed on the cushion frame, the cushion cover 20 is covered on the cushion pad 10, and an end portion thereof is locked and fixed to the cushion frame. The end portions of the cushion cover 20 are rolled into the through hole 11 from the outer peripheral edge portions of the front opening 33 and the rear opening 34 of the through hole 11 and fixed to the outer peripheral wall portion by adhesion. Then, the cover member 30 and the attaching member 40 are attached in the through hole 11 of the cushion pad 10 as described above. Finally, the seat back 2 is attached to the seat cushion 3 to complete the automobile seat 1. Then, in order to pass the wire 60 of the ISOFIX anchor attached to the floor F to the through hole 11 of the seat cushion 3, the automobile seat 1 approaches the floor F. In a side view, the automobile seat 1 is attached to the floor F in a state where the horizontal rod portion 62 of the wire 60 is positioned on a side opposite to the opening of the notch 32a1 of the left and right side plate portions 32a of the cover member 30.

The present embodiment configured as described above provides the following operational effects. The R-chamfered portion 30A with a relatively large radius is formed between the front plate portion 31 and the side plate portion 32 on the cover member 30. Therefore, when inserting the connector 5a of the child seat 5 into the through hole 11, the connector 5a can be guided into the through hole 11 even if the tip end portion of the connector 5a abuts on the cover member 30. Further, the light chamfered outer peripheral edge portion 50A of the lid member 50 abut on and is attached to the inner side face 32A of the side plate portion 32 of the cover member 30 at the flat plate portion rear than the R-end point 30B of the side plate portion 32. Therefore, the gap between the side plate portion 32 of the cover member 30 and the outer peripheral edge portion 50A of the lid member 50 is made small and the lid member can be attached with good appearance. Furthermore, the lid member 50 can be attached to and detached from the cover member 30. Therefore, the cover member 30 can be used in a state where the lid member 50 is detached if there is no problem in appearance, so that a degree of freedom for the method of using the cover member 30 is expanded.

Although a specific embodiment has been described above, the disclosure is not limited to those configurations, and various modifications, additions and deletions are possible without changing the spirit of the disclosure. For example, the following configurations can be exemplified.

1. In the above embodiment, the lid member 50 is attachable to and detachable from the cover member 30, but the disclosure is not limited thereto, and one side of the lid member 50 can be attached to the cover member 30 via an integral hinge portion and can be opened and closed.

Figure 6:
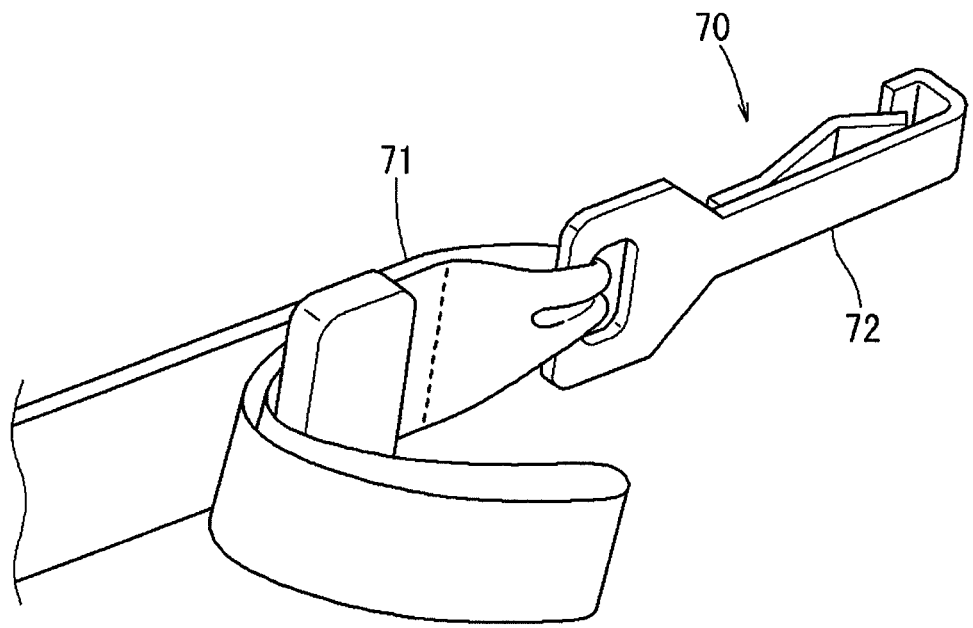
FIG. 6 is a perspective view showing another type of an attaching member different from that of the above-described embodiment.

2. In the above embodiment, a type in which the connector 5a of the child seat 5 is connected to the wire 60 is used, but the disclosure is not limited thereto, and a type in which a tether belt 70 is connected as shown in FIG. 6 may also be used. In the type using the tether belt 70, a hook 72 attached to an end portion of a belt 71 attached to the child seat 5 is inserted in the side plate portion 32 of the cover member 30. In this case, since the R-chamfered portion 30A with a relatively large radius is formed on the cover member 30, the hook 72 can be guided into the through hole 11 even if a tip end portion thereof abuts on the cover member 30. Here, the hook 72 corresponds to the "attaching member" in the claims.

3. In the above embodiment, the outer peripheral edge portion 50A of the lid member 50 abuts on and is attached to the side plate portion 32 of the cover member 30 at the flat plate portion rear than the R-end point 30B of the side plate portion 32. However, the disclosure is not limited thereto, and the outer peripheral edge portion 50A of the lid member 50 may be attached so as to be positioned at the R-end point 30B of the side plate portion 32.

4. In the above embodiment, the wire 60 of the ISOFIX anchor is fixed to the floor F which is the vehicle body via the base member. However, the disclosure is not limited thereto, and the wire 60 may be fixed to the vehicle body via the cushion frame or the back frame.

5. In the above embodiment, the chamfer radius of the R-chamfered portion 30A is constant, but the disclosure is not limited thereto, and the radius may gradually change as long as the function of smoothly guiding the connector 5a is fulfilled.

6. In the above embodiment, a case where the disclosure is applied to the automobile seat 1 of a front side seat of an automobile is described, but the disclosure is not limited thereto, and also can be applied as a seat of a rear side seat of an automobile in which a seat cushion and a seat back are separated. Further, the disclosure may also be applied to a seat mounted on a ship, a train, an airplane, or the like other than an automobile.

The disclosure provides illustrative, non-limiting examples as follows:

According to a first aspect, there is provided a vehicle seat in which a through hole extending substantially in a front-rear direction is provided at a rear end portion of a seat cushion or a lower end portion of a seat back, a locking member attached to a vehicle body being provided in the through hole, and the locking member being configured to lock an attaching member which is provided to a child seat and inserted inside the through hole, the vehicle seat including: a cover member including: a front plate portion covering an opening edge portion of a front opening of the through hole; and a tubular side plate portion extending rearward from an inner end portion of the front opening of the front plate portion and covering at least a part of an outer peripheral wall portion of the through hole; and a substantially flat plate-shaped lid member having an outer peripheral edge portion along an inner side face of the side plate portion and configured to be attached to the cover member in a state where the outer peripheral edge portion thereof abuts on the inner side face of the side plate portion, wherein the cover member includes an R-chamfered portion configured to guide the attaching member into the through hole, the R-chamfered portion being formed between the front plate portion and the side plate portion, and wherein the outer peripheral edge portion of the lid member abuts on the side plate portion of the cover member at an R-end point of the R-chamfered portion or at a position rear than the R-end point, so that the lid member is attached to the cover member.

Accordingly, since the R-chamfered portion configured to guide the attaching member into the through hole is formed between the front plate portion and the side plate portion, the attaching member can be guided into the through hole even if a tip end portion thereof abuts on the cover member when inserting the attaching member into the through hole. In addition, since the outer peripheral edge portion of the substantially flat plate-shaped lid member abut on and is attached to the side plate portion of the cover member at the position rear than the R-end point of the R-chamfered portion of the side plate portion, a gap between the side plate portion of the cover member and the outer peripheral edge portion of the lid member is made small and the lid member can be attached with good appearance.

According to a second aspect, there is provided the vehicle seat according to the first aspect, wherein the lid member is provided with a recess to which a finger is configured to be hooked to when detaching the lid member.

Accordingly, the lid member can be easily attached to and detached from the cover member, thereby improving operability.

According to a third aspect, there is provided the vehicle seat according to the first aspect, wherein the side plate portion includes a pair of left and right side plate portions, an upper side plate portion, and a lower side plater portion, and wherein each of the left and right side plate portions is provided with a standing wall which extends in parallel with the upper side plate portion.

What is claimed is:

1. A vehicle seat in which a through hole extending substantially in a front-rear direction is provided at a rear end portion of a seat cushion or a lower end portion of a seat back, a locking member attached to a vehicle body being provided in the through hole, and the locking member being configured to lock an attaching member which is provided to a child seat and inserted inside the through hole, the vehicle seat comprising:
    a cover member including:
        a front plate portion covering an opening edge portion of a front opening of the through hole; and
        a tubular side plate portion extending rearward from an inner end portion of the front opening of the front plate portion and covering at least a part of an outer peripheral wall portion of the through hole; and
    a substantially flat plate-shaped lid member having an outer peripheral edge portion along an inner side face of the side plate portion and configured to be attached to the cover member in a state where the outer peripheral edge portion thereof abuts on the inner side face of the side plate portion,
    wherein the cover member includes an R-chamfered portion configured to guide the attaching member into the through hole, the R-chamfered portion being formed between the front plate portion and the side plate portion,
    wherein the outer peripheral edge portion of the lid member abuts on the side plate portion of the cover member at an R-end point of the R-chamfered portion or at a position further rear than the R-end point, so that the lid member is attached to the cover member, and
    wherein in a state where the outer peripheral edge portion of the lid member abuts on the side plate portion of the cover member, an entire front surface of the lid member is located at or behind the R-end point of the R-chamfered portion.

2. The vehicle seat according to claim 1,
    wherein the lid member is provided with a recess to which a finger is configured to be hooked to when detaching the lid member.

3. The vehicle seat according to claim 1,
    wherein the side plate portion includes a pair of left and right side plate portions, an upper side plate portion, and a lower side plate portion, and
    wherein each of the left and right side plate portions is provided with a standing wall which extends in parallel with the upper side plate portion.

4. A vehicle seat in which a through hole extending substantially in a front-rear direction is provided at a rear end portion of a seat cushion or a lower end portion of a seat back, a locking member attached to a vehicle body being provided in the through hole, and the locking member being configured to lock an attaching member which is provided to a child seat and inserted inside the through hole, the vehicle seat comprising:
    a cover member including:
        a front plate portion covering an opening edge portion of a front opening of the through hole; and
        a tubular side plate portion extending rearward from an inner end portion of the front opening of the front plate portion and covering at least a part of an outer peripheral wall portion of the through hole; and
    a substantially flat plate-shaped lid member having an outer peripheral edge portion along an inner side face of the side plate portion and configured to be attached to the cover member in a state where the outer peripheral edge portion thereof abuts on the inner side face of the side plate portion,
    wherein the cover member includes an R-chamfered portion configured to guide the attaching member into the through hole, the R-chamfered portion being formed between the front plate portion and the side plate portion,
    wherein the outer peripheral edge portion of the lid member abuts on the side plate portion of the cover member at an R-end point of the R-chamfered portion or at a position further rear than the R-end point, so that the lid member is attached to the cover member,
    wherein the side plate portion includes a pair of left and right side plate portions, an upper side plate portion, and a lower side plate portion, and
    wherein each of the left and right side plate portions is provided with a standing wall which extends in parallel with the upper side plate portion.

* * * * *